United States Patent [19]

Le Houerou et al.

[11] Patent Number: 4,646,433
[45] Date of Patent: Mar. 3, 1987

[54] DEVICES FOR ATTACHING ONE OR A NUMBER OF AERIAL CABLES THERETO

[75] Inventors: Gilbert Le Houerou, Lannion; Guy Bouchez, Louannec; Pierre Preynat, Montpellier; Charles Villain, Bry sur Marne, all of France

[73] Assignee: Goro S.A., Chelles, France

[21] Appl. No.: 748,611

[22] Filed: Jun. 25, 1985

[51] Int. Cl.[4] .............................................. H01R 43/00
[52] U.S. Cl. ..................................... 29/755; 29/779; 174/41; 174/146; 248/63
[58] Field of Search ................. 174/145, 146, 144, 42, 174/41; 248/61, 63; 254/134.3 R, 134.3 PA; 29/782, 809, 816, 819

[56] References Cited

U.S. PATENT DOCUMENTS

| | | | |
|---|---|---|---|
| 2,912,482 | 11/1959 | Horrocks et al. | 174/41 X |
| 3,076,863 | 2/1963 | Lantz et al. | 248/63 |
| 3,155,354 | 11/1964 | Lindsey | 248/63 |
| 3,229,025 | 1/1966 | Barwick | 174/146 X |
| 3,530,562 | 9/1970 | Baumgardner et al. | |

FOREIGN PATENT DOCUMENTS

| | | |
|---|---|---|
| 901186 | 11/1953 | Fed. Rep. of Germany . |
| 1242149 | 8/1960 | France . |
| 2385929 | 10/1978 | France . |
| WO82/02239 | 7/1982 | PCT Int'l Appl. . |
| 425932 | 6/1967 | Switzerland . |

*Primary Examiner*—Howard N. Goldberg
*Assistant Examiner*—Carl J. Arbes
*Attorney, Agent, or Firm*—Young & Thompson

[57] ABSTRACT

In a telecommunication line, a cable-attachment spacer for securing one or a number of suspended cables to a suspension cable comprises a male component and a female component forming passageways for the cables when assembled together. The female component has at least two spaced slots disposed vertically in superposed relation and having their openings on at least one side of the component. One slot is provided for the suspension cable and at least one slot is provided for one or a number of suspended cables. The corresponding male component comprises a finger which is brought into position in front of the bottom ends of the slots, thus confining the cables placed within the slots.

7 Claims, 13 Drawing Figures

DEVICES FOR ATTACHING ONE OR A NUMBER OF AERIAL CABLES THERETO

BACKGROUND OF THE INVENTION

1. Field of the Invention

The present invention relates to a device for the flexible assembly of a plurality of aerial or so-called overhead cables employed for telephone or electric power transmission by securing them to a suspension cable in such a manner as to endow the assembly with a sufficient degree of flexibility and good mechanical strength. A device of this type can also be employed for fastening a single transmission cable to a suspension cable.

2. Description of the Prior Art

Different types of cable-attachment devices for the purpose just mentioned already exist. However, such devices are not suited to the particular problem which forms the basis of the present invention, namely the installation of aerial telecommunication line systems comprising a number of suspended cables of relatively low strength such as cables comprising conductors of copper or of bronze, or optical fibers.

Thus German Pat. No. DE 901.186 describes an attachment device for fastening together a suspended cable and a suspension cable. This device is constituted by two complementary members, namely a male member and female member respectively. The first member consists of a stirrup-piece which is intended to be placed astride the suspended cable. The second member is designed in the form of a U-shaped cradle to be placed beneath the suspended cable, the side arms of said second member being fixed on the sides of the first member by engagement of hooking means. The advantage of this device lies in the fact that it can be mounted rapidly. However, it is attended by a major drawback in that the attachment of the female member to the male member is unreliable. In actual fact, uncoupling of these two members results in falling of the suspended cable. Furthermore, this attachment device permits fastening of only one suspended cable to the suspension cable. In consequence, it is not possible by means of this device to solve the basic problem of the invention, that is, the construction of telecommunication systems comprising a plurality of suspended cables attached to a suspension cable.

A Swiss Pat. No. DE 425.932, describes an attachment device which is intended to be employed for the same purpose as the device described in the foregoing and is constituted by a single stirrup-piece. This stirrup-piece is intended to be placed astride the suspension cable and has arms provided with recesses which form the necessary passageways for a suspension cable as well as for a suspended cable located beneath this latter. Said stirrup-piece is formed of elastic material and provision is made for a bottom bolt for clamping the lower ends of said two arms after the cables have been positioned within their recesses. However, this device is not practical to install since it is necessary to remove the clamping bolt in order to fit the cables in position. Furthermore, this device is essentially designed for the attachment of a single cable suspended from the suspension cable. It is true that, in the alternative embodiment shown in FIG. 5 of the cited patent, provision is made for the possibility of attaching two suspended cables. However, one of these cables is placed in that case above the suspension cable, which is a highly unsatisfactory solution for relatively low-strength transmission cables. Furthermore, this solution permits the attachment of two suspended cables at most, which does not always solve the problem presented.

SUMMARY OF THE INVENTION

For the reasons given in the foregoing, the object of the present invention is to provide a cable-attachment device or so-called spacer so designed as to fasten a plurality of suspended cables to a single suspension cable while ensuring both high mechanical strength of the assembly and a sufficient degree of flexibility to avoid damage or destruction of the suspended cables. At the same time, the spacing maintained between the different cables is sufficient to prevent wind resistance as well as accumulation of ice in the winter. The device in accordance with the invention is also arranged so that it can very readily be placed in position on the cables to be fastened together, thereby ensuring that a series of devices of this type can be distributed at intervals along the entire length of a telecommunication line, the installation of the series being carried out as required by means of a suitable apparatus.

To this end, the attachment device in accordance with the invention (hereinafter designated as a cable-attachment spacer) comprises two components consisting respectively of a male component and a female component which are intended to be assembled together and are capable of forming passageways for the corresponding cables between each other. The distinctive feature of the invention lies in the fact that the female component has at least two slots having their openings on at least one of the sides of said female component which are intended to be placed vertically, namely a slot for the suspension cable and at least one slot for a suspended cable, and that the male component has a finger which is capable of moving into position in front of the bottom end of the slots, thus confining the cables placed within said slots.

Thus the device under consideration can be very readily placed in position on a telecommunication line by engaging the different cables within the slots of the female component and by then inserting the male component within this latter, thus ensuring that the cables are then confined within their different respective recesses. It is worthy of note in this connection that, in the standby position, the male component of each cable-attachment spacer is engaged within the female component to a very slight extent, with the result that it is then necessary only to insert said male component without entailing any need to carry out an assembly operation in situ.

In a particular embodiment, the female component takes the form of a casing which is open at the upper end thereof and the male component is constituted by a drawer which is capable of being engaged within said casing at the upper end thereof. Said drawer is provided with a slot for receiving the corresponding cables, said slot being located in alignment with the bottom ends of the slots of the female component.

In another embodiment, the female component of the cable-attachment spacer is constituted by a solid component having one or two series of slots which open on one or both vertical sides of said component. In the case of each series of slots, said female component is provided with a passageway which has its opening at the upper end of said component and intersects the corresponding slots at an intermediate point of their length.

The male component is accordingly adapted to carry a locking finger which is intended to be engaged within said passageway, thereby imprisoning the cables placed in the bottom ends of the corresponding slots.

Preferably, in each case, the slots for receiving the suspended cables comprise compressible elements for inserting cables having different diameters without any attendant danger of damage to such cables.

The invention is also directed to an apparatus for mounting a cable-attachment spacer on a line formed by a suspension cable and one or a number of suspended cables. The distinctive feature of the apparatus in accordance with the invention lies in the fact that said apparatus is provided with suspension rollers which are capable of running on the suspension cable in order to permit displacement of said apparatus along said suspension cable. In addition, said casing is provided on the one hand with a magazine for receiving a series of cable-attachment spacers on each of which the male component is engaged within the female component to a very slight extent. Said casing is provided on the other hand with a first pusher for positioning an attachment spacer on the cables and with a second pusher which is capable of vertical displacement for subsequent insertion of the male component of said attachment spacer within the female component.

BRIEF DESCRIPTION OF THE DRAWINGS

Other features of the invention will become more apparent upon consideration of the following description and accompanying drawings, wherein.

DESCRIPTION OF THE PREFERRED EMBODIMENTS

Figure 1:
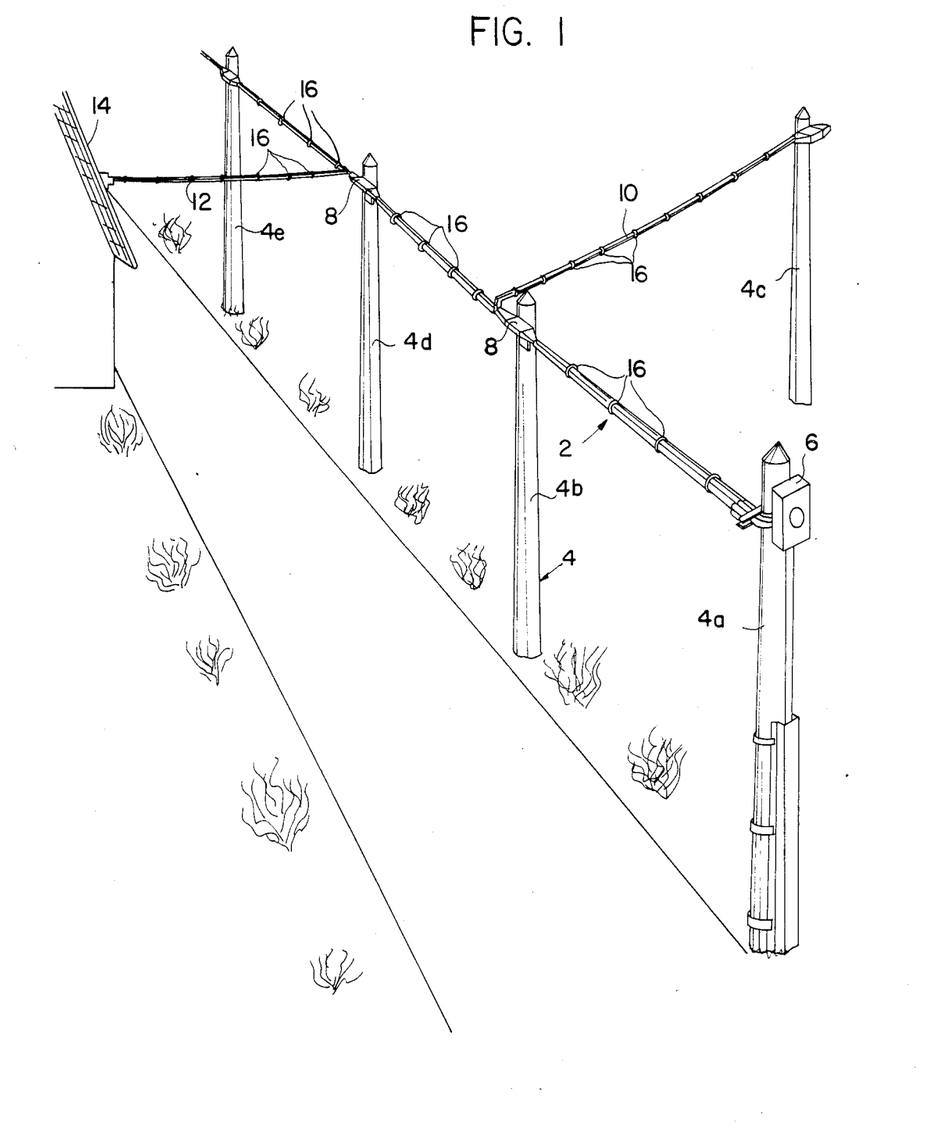
FIG. 1 is a schematic view in perspective showing an aerial telephone system.

FIG. 1 illustrates a line 2 of telephone cables, for example, which are supported by a plurality of poles 4. The first pole which is designated by the reference 4a supports a junction box 6. The top portion of the second pole 4b is equipped with a line-mounting system 8 which will hereinafter be described in greater detail with reference to FIG. 2. Starting from the pole 4b, one of the transmission cables 10 is directed towards a pole 4c. The rest of the line is directed towards a fourth pole 4d equipped with a line-mounting system 8 which is identical with the preceding system. A cable 12 is directed from said pole 4c to a residential building 14. The rest of the line 2 then continues towards a pole 4e, each cable constituting the line being directed from a predetermined location to the utilization location. The assembly of cables constituting the line 2 comprises in conventional manner a suspension cable and a plurality of suspended cables. Said line is equipped with a series of cable-attachment spacers 16 in accordance with the invention. Said attachment spacers are placed at intervals along the cables and also equip the cables 10 and 12.

Figure 2:
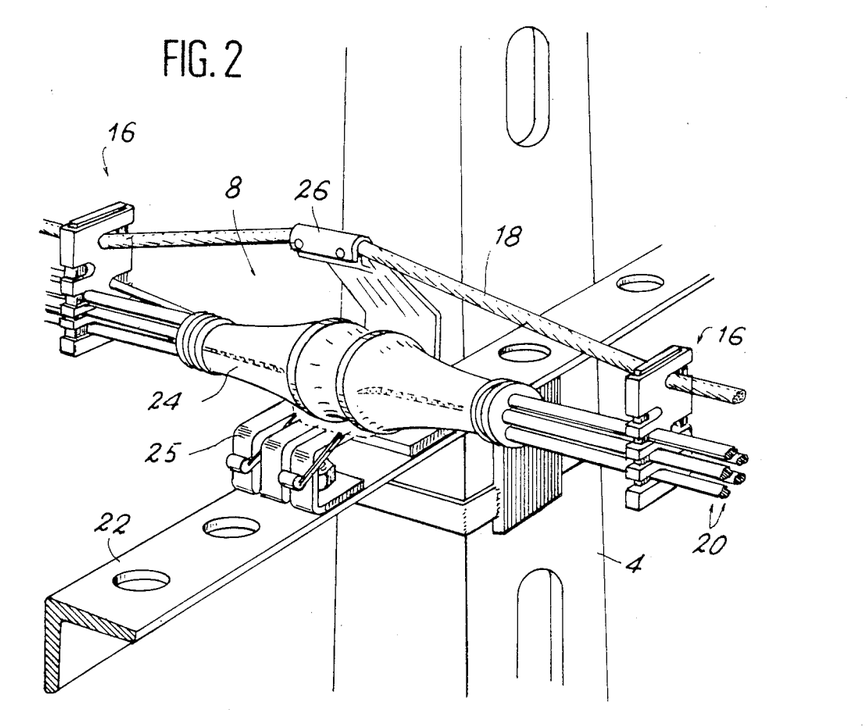
FIG. 2 is a schematic view in perspective on a larger scale illustrating one mode of attachment of the suspension and suspended cables to a pole.

FIG. 2 illustrates an example of construction of the system 8 for mounting the line 2 on a pole 4. It is apparent from this figure that said line is composed of a suspension cable 18 (for example a cable of stranded steel wire) and of a plurality of suspended cables 20 which can be telephone cables, electric cables, optical-fiber cables, and so on. The line-mounting system 8 comprises a crossarm 22 secured to the pole 4 and intended to serve as a support for a sleeve 24 of elastic material within which are enclosed the suspended cables 20. The sleeve for attaching these cables is fixed on a support 25 which is in turn carried by the crossarm 22. However, this crossarm is also adapted to carry a bracket 26 on which the suspension cable 18 is fixed.

FIG. 2 also shows two cable-attachment spacers 16 in accordance with the invention and located on each side of the line-mounting system 8.

Figures 3, 4, 5:
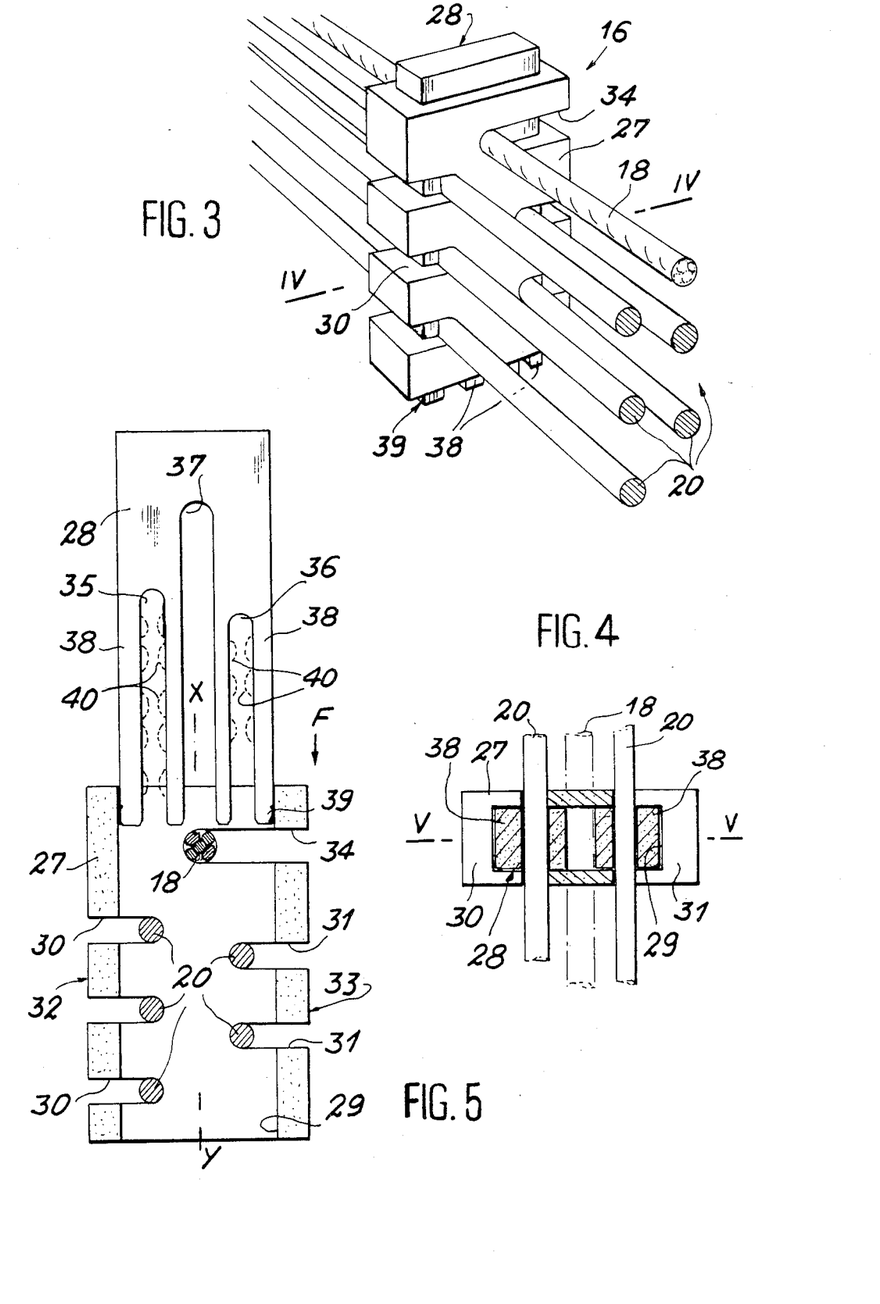
FIG. 3 is a schematic view in perspective showing a first embodiment of a cable-attachment spacer in accordance with the invention.
FIG. 4 is a transverse sectional view taken along line IV—IV of FIG. 3.
FIG. 5 is a vertical sectional view taken along line V—V of FIG. 4 but in which the corresponding cable-attachment spacer is shown in the standby position prior to positioning of the cables to be secured.

In the example illustrated in FIGS. 3 to 5, each of these devices is constituted by the combination of a female component 27 in the form of a hollow casing and of a male component 28 which virtually constitutes a drawer. This male component or drawer can be inserted within the internal space 29 of the casing 27 which has an opening respectively at the top and bottom end of this latter. Said casing is provided with two series of slots 30 and 31 which have their openings on two opposite sides 32 and 33 of the casing, these opposite sides being intended to be placed which each series disposed vertically at the time of positioning of the cable-attachment device under consideration. As shown in the drawings, the slots 30 and 31 accordingly extend in a horizontal direction. However, they could also be inclined either upwards or downwards.

In addition to these two series of slots which are intended to receive the suspended cables 20, provision is made for a top slot 34, the intended function of which is to receive the suspension cable 18. The innermost end of said top slot is essentially located in the median plane X-Y of the casing 27 whilst the innermost ends of the two series of slots 30 and 31 are located on each side of said plane.

The male component 28 which forms a drawer has three slots 35, 36 and 37 of substantial depth which extend vertically and have their openings at the lower end of said component. The arrangement of these slots is such that, at the time of insertion of the drawer 28 into the casing 27 in the direction of the arrow F, the cables 20 positioned within the slots 30 are thus confined within the slot 35 whilst the cables 20 placed within the slots 31 are confined within the slots 30. So far as the suspension cable 18 is concerned, this cable is confined in the upper in the bottom end of the slot 37. Thus the different cables are prevented from escaping from their recesses by virtue of the very fact that the drawer 28 is specially cut-out so as to form a plurality of locking fingers 38 which extend from the upper ends of the different slots.

It is worthy of note that, in its standby position prior to assembly, each cable-attachment spacer has a distinctive feature in that the lower end of the drawer 28 is engaged within the upper end of the casing 27 to a very slight extent as shown in FIG. 5. Thus, after the cables 18 and 20 have been placed within the respective slots 30, 31 and 34, it is only necessary to insert said drawer by displacement in sliding motion in the direction of the arrow F in order to confine all the cables without any need to carry out an operation involving assembly of the two components 27 and 28.

Preferably, the height of the drawer 28 is such that the ends of the locking fingers 38 of this latter project outwards from the casing 27 after they have been fully engaged (as shown in FIG. 3). These ends can thus be provided with fillets 39 or any other suitable raised edges which permit interassembly of the two components 27 and 28 as well as subsequent disassembly. However, it must be pointed out that the weight of the suspended cables is in no way liable to cause uncoupling of these two components since the cables are housed within slots of the female component 27, and the same applies to the suspension cable 18 itself.

The internal faces of the slots 35 and 36 which are intended to receive the suspended cables 20 are preferably provided with resilient bulges 40, the design function of which is to secure cables having different diameters or non-constant cross-sectional areas without incurring any risk of damage to these latter.

Figure 6:
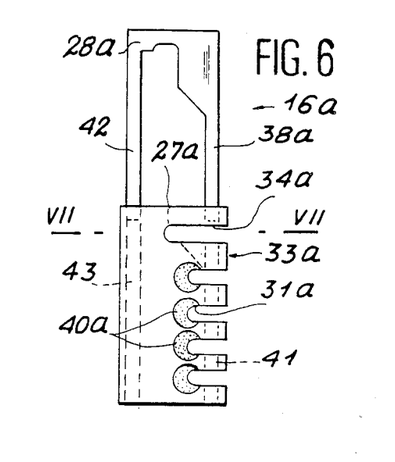
FIG. 6 is a view in elevation showing another embodiment of the cable-attachment spacer which is also illustrated in the standby position.
Figure 7:
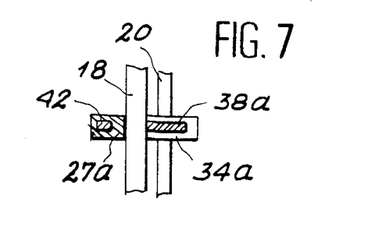
FIG. 7 is a sectional view taken along line VII—VII of FIG. 6 after positioning and imprisoning of the cables to be secured.
Figure 8:
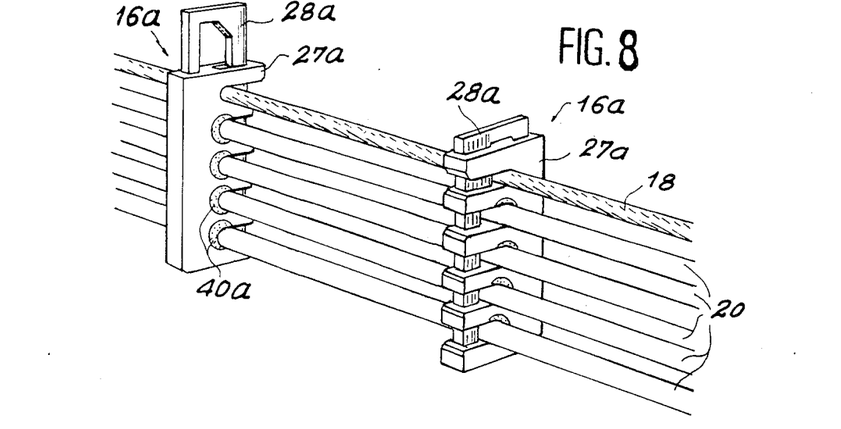
FIG. 8 is a fragmentary view in perspective showing a telecommunication line on which are installed two cable-attachment spacers in accordance with FIGS. 6 and 7, one of said spacers being shown during installation.

FIGS. 6 to 8 illustrate another embodiment of the cable-attachment spacers in accordance with the invention. Each of these attachment devices is constituted by the combination of a female component 27a and of a male component 28a. The component 27a is constituted by a solid body comprising a series of slots 31a which have their openings on one of its vertical sides such as the side 33a in the example shown. These different slots are intended to receive suspended cables 20. However, provision is made above said series of slots for a slot 34a which also opens on the vertical side 33a and which is intended to receive the suspension cable 18. In the bottom end of each slot 31a, a pad 40a of elastic material is provided for clamping the corresponding suspended cable without any risk of damage to this latter. Each pad can be separately fitted in the bottom end of the corresponding slot or formed by means of a suitable method at the time of manufacture of the female component 27a.

Said female component also has a passageway 41 which extends in a direction parallel to the vertical side 33a and which intersects the different slots 31a at an intermediate point of their length. Said passageway, which has an opening both at the upper end and at the lower end, is intended to receive a locking finger 38a carried by the male component 28a. However, said male component is also adapted to carry another parallel finger 42 corresponding to another passageway 43 of the female component 27a. This second locking finger simply performs the function of a guide member at the time of insertion of the male component 28a.

As in the previous embodiment, the lower end of the male component 28a, or more precisely the lower end of each of the two fingers 38 and 42 of these latter, is engaged to a very slight extent in the upper end of the female component 27a when the corresponding cable-attachment spacer is in the standby position. Again in this instance, after engaging the cables 18 and 20 within the corresponding slots, it is consequently necessary only to insert the male component 28a which forms a drawer in order to ensure that these cables are confined and securely maintained in position with respect to each other. Preferably, the cable-attachment spacers thus formed are mounted alternately in one direction and in the other as shown in FIG. 8.

Figure 9:
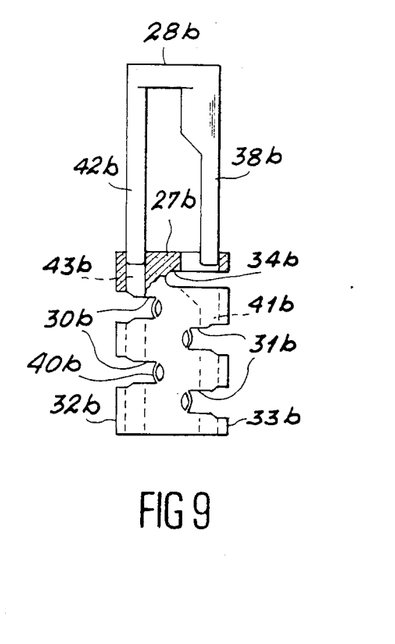
FIGS. 9 and 10 are views respectively in elevation and in perspective showing two further embodiments of the cable-attachment spacer in accordance with the invention.

FIG. 9 illustrates an alternative embodiment of the cable-attachment spacer shown in FIGS. 6 to 8. In this variant, the corresponding female component 27b has two series of slots 30b and 31b which open respectively on two opposite vertical sides 32b and 33b of this latter. In addition to these slots which are intended to receive the suspended cables 20, provision is made for a top slot 34b for receiving the suspension cable 18.

Said female component further comprises two vertical passageways 41b and 43b which intersect the slots 30b and 31b at an intermediate point of their length. So far as concerns the male component 28 which forms a drawer, this component is provided with two locking fingers 38b and 42b which are intended to be inserted in the two passageways 41b and 43b. Preferably, the inner end of each slot 30b and 31b is provided with a resilient strip 40b which is designed virtually to replace the pads 40a provided in the preceding embodiment.

Figure 10:
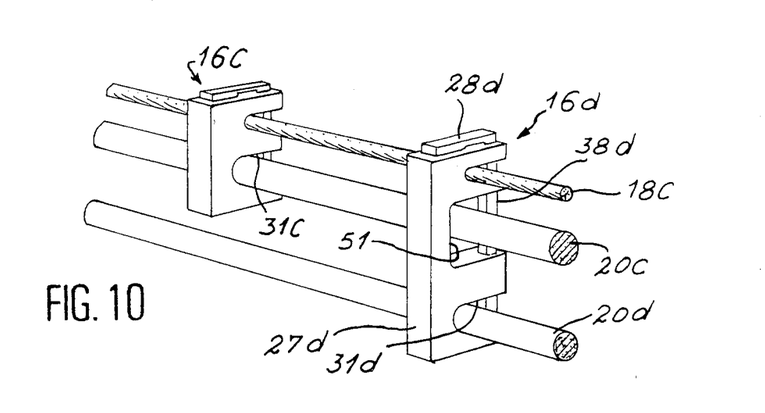

FIG. 10 shows another alternative embodiment in which the corresponding device is so designed as to permit attachment of one or a number of suspended cables to a suspension cable 18c which already carries one or a number of suspended cables. It is postulated in the example shown in this figure that the cable 18c already carries a single suspended cable 20c which is attached to the suspension cable by means of a cable-attachment spacer 16c of the same type as that shown in FIGS. 6 to 8, the sole difference being that said spacer is provided with only one receiving slot 31c.

Attachment of one or a number of additional suspended cables, namely a single cable 20d in the example shown, is ensured by means of the attachment spacer 16d, the female component 27d of which is endowed with a special feature in that it has a recess 51 of substantial width providing a passageway for the suspended cable 20c which is already in position. At its lower end, said female component 27d has one or a number of slots for receiving the additional suspended cables to be attached to the same suspension cable. As will readily be apparent, the locking finger 38d of the component 28d is of sufficient length to confine the cable or cables 20d.

Figure 11:
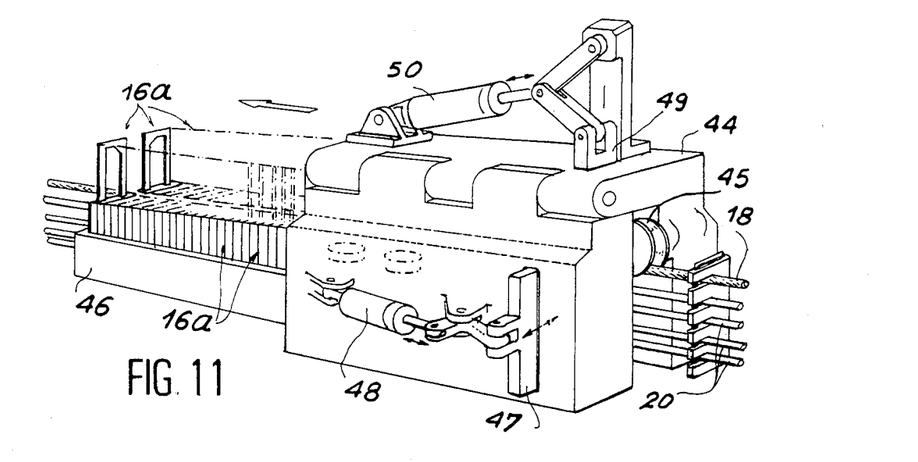
FIG. 11 is a schematic view in perspective showing an apparatus employed for mounting the cable-attachment spacers in accordance with the invention on the cables to be secured.

FIG. 11 illustrates an apparatus which is specially designed for mounting cable-attachment spacers in accordance with the invention on a telecommunication line in order to fasten together the suspended cables 20 and the suspension cable 18 of said line. In the example shown, this apparatus is more particularly designed for mounting cable-attachment spacers 16a of the type shown in FIGS. 6 and 7, that is to say devices in which the female component 27a has slots which are all oriented in the same direction.

The casing 44 of said apparatus has the general shape of a flat arch placed astride the cables 18 and 20. Said casing is constructed in the form of two portions hinged together and can thus be opened-out in order to permit withdrawal of the cables. In the upper end of the passage thus formed within said casing, provision is made for a plurality of suspension rollers 45 which are intended to run on the suspension cable 18 in order to permit displacement of the apparatus along the corresponding line. At least one of said rollers is a drive roller for imparting motion to the apparatus in the direction of the arrow F1. However, different means could be adopted for driving the apparatus. By way of example, it would be possible to employ a reciprocating-motion jack adapted to carry a clamp which is capable of gripping the suspension cable.

Since the apparatus considered in the foregoing is designed for mounting cable-attachment spacers 16a which are oriented alternately in one direction and in the other (as shown in FIG. 8), its casing 44 is adapted to carry two magazines 46 for receiving two series of attachment spacers 16a which are oriented in opposite directions and are intended virtually to constitute supply elements for the apparatus. Each series of cable-attachment spacers is slidably mounted within the corresponding magazine and thrust-exerting means (not shown in the drawings) tend to push said spacers back towards the rear end of the casing 44.

Figure 12:
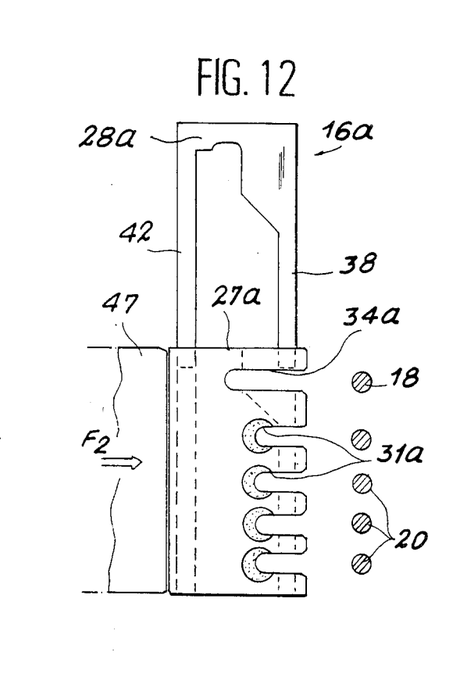
FIGS. 12 and 13 are diagrams illustrating two successive steps of the operation involved in mounting a cable-attachment spacer of this type by means of said apparatus.
Figure 13:
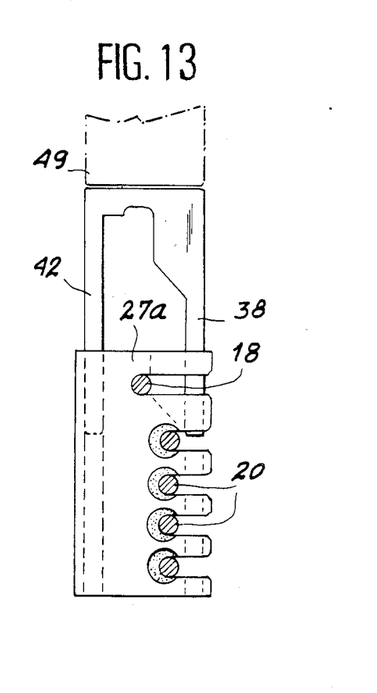

Said casing is provided on each side with a pusher 47 which can be actuated by a jack 48 for the purpose of exerting a transverse thrust in the direction of the arrow F2 of FIG. 12 on the first cable-attachment spacer of the corresponding series in order to subject said spacer to a transverse movement and thus to engage this latter on the cables 18 and 20 in such a manner as to ensure that said cables are placed in the innermost bottom ends of the slots 31a and 44a (as shown in FIG. 11).

However, the apparatus is provided in addition with a top pusher 49 which is capable of vertical displacement. Said pusher 49 is actuated by a jack 50 and capable of exerting a thrust on the male component 28a of the cable-attachment spacer as soon as this latter has been placed on the cables 18 and 20 (see FIG. 12).

Thus said apparatus is designed for mounting cable-attachment spacers 16a at uniform intervals along the line formed by the cables 18 and 20 in such a manner as to fasten the cables together. Moreover, the arrangement of these cable-attachment spacers is specially intended to permit easy installation of the spacers by means of this apparatus. It should again be recalled in this connection that, in the standby position, the male component of each cable-attachment spacer is already partly engaged within the corresponding female component, with the result that it then remains necessary only to insert the male component to the full extent after positioning of the cables within the slots of said component.

However, the cable-attachment devices or spacers shown in FIGS. 3 to 5 and those shown in FIG. 9 can also be installed by means of a mounting apparatus of the same type. In that case the engagement of the cables within the slots of the female components is no longer carried out by means of lateral pushers 47 but by guiding the cables to the bottom ends of said slots, this being achieved by means of suitable guide-members such as rollers, for example. Provision is accordingly made for only one loading magazine containing a series of cable-attachment spacers which are placed in succession and at uniform intervals between the cables 18 and 20.

As in the previous embodiment, however, this apparatus comprises a vertical pusher 49 for inserting the male component of each cable-attachment spacer within the corresponding female component.

The conceptual design of the cable-attachment devices in accordance with the invention is such that they not only permit very easy installation but are also capable of effectively maintaining the cables of a telephone line or electric power line with a predetermined spacing between the suspension cable and the suspended cables, thus reducing wind resistance and the mass of ice which is liable to accumulate on the cables in the event of frost. Furthermore, position-maintenance of the cables is highly effective since the pressure exerted on the suspension cable is relatively high whilst the suspended cables are maintained with a sufficient pressure to prevent any slippage of the holding elements on the cables but this pressure is sufficiently low to guard against any danger of damage to the cables.

What is claimed is:

1. A cable attachment device for securing and spacing a plurality of cables extending in a given direction, said device comprising a first member adapted to house said plurality of cables in spaced relation and a second member adapted to interfit with said first member and secure said plurality of cables in said first member; said first member comprising a casing having front and back faces extending in parallel planes substantially perpendicular to said given direction, two lateral faces interconnecting said front and back faces, an open upper end, and a lower end interconnecting said front and back faces; said first member further comprising a plurality of slots, said plurality of slots being of essentially constant width along said front and back faces and opening on at least one of said two lateral faces and terminating in an end a substantial distance short of the other of said two lateral faces, and at least one channel extending from said open upper end and passing through at least one of said plurality of slots and between said lateral and said front and back faces at a predetermined distance from each said slot end; said second member comprising at least one projection adapted to slidably engage in said at least one channel, and means for limiting the extent of engagement of said projection in said channel.

2. A cable attachment device according to claim 1, wherein said plurality of slots comprises at least one first slot opening on one of said two lateral faces and at least one second slot opening on the other of said two lateral faces, said at least one channel comprising first and second parallel channels, said first channel passing through said at least one first slot at a predetermined distance from each said slot end and said second channel passing through said at least one second slot at a predetermined distance from each said slot end, said second member comprising first and second projections formed integrally therefrom, said first and second projections adapted to slidably engage in said first and second channels, respectively.

3. A cable attachment device according to claim 1, wherein said plurality of slots all open on the same said lateral face, and said at least one channel is one channel passing through said plurality of slots at a predetermined distance from said slot ends.

4. A cable attachment device according to claim 1, wherein said at least one channel extends through said lower end of said first member, and said at least one projection of said second member extends through said at least one channel, when said first and second members are in assembled relation.

5. A cable attachment device according to claim 2, wherein said at least one first slot comprises an additional slot extending further toward said other lateral face than does the other said at least one first slot, and said at least one channel comprises third and fourth parallel channels, said third channel intersecting solely said additional slot and said fourth channel passing between said end of said additional slot and said end of said at least one second slot; said at least one projection comprising third and fourth parallel projections adapted to slidably engage in said third and fourth channels.

6. A cable attachment device according to claim 1, wherein said predetermined distance corresponds to the diameter of each of said plurality of cables to be housed.

7. A cable attachment device according to claim 1, wherein each of said slot end comprises a resilient element adapted resiliently to secure each of said plurality of cables.

* * * * *